United States Patent
Malachowsky (10) Patent No.: US 10,510,269 B2
(45) Date of Patent: Dec. 17, 2019

(54) BLOOD TYPING INSTRUCTIONAL SYSTEM

(71) Applicant: Kenneth J Malachowsky, Florence, SC (US)

(72) Inventor: Kenneth J Malachowsky, Florence, SC (US)

( * ) Notice: Subject to any disclaimer, the term of this patent is extended or adjusted under 35 U.S.C. 154(b) by 235 days.

(21) Appl. No.: 15/645,598

(22) Filed: Jul. 10, 2017

(65) Prior Publication Data

US 2018/0012518 A1    Jan. 11, 2018

Related U.S. Application Data

(60) Provisional application No. 62/359,835, filed on Jul. 8, 2016.

(51) Int. Cl.
  *G09B 23/28* (2006.01)
  *G09B 23/34* (2006.01)
  *G09B 23/32* (2006.01)

(52) U.S. Cl.
  CPC ............ *G09B 23/34* (2013.01); *G09B 23/32* (2013.01)

(58) Field of Classification Search
  USPC ................. 434/262, 268, 272, 295
  See application file for complete search history.

(56) References Cited

U.S. PATENT DOCUMENTS

| | | | | |
|---|---|---|---|---|
| 3,939,581 A | * | 2/1976 | Clarke, Jr. ............ | G09B 23/26 434/278 |
| 5,055,259 A | * | 10/1991 | Inoue ..................... | G09B 19/00 422/430 |
| 5,158,461 A | * | 10/1992 | Sulway .................. | G09B 23/30 428/16 |
| 6,280,199 B1 | * | 8/2001 | Baker .................... | G09B 23/24 434/276 |
| 7,651,333 B2 | * | 1/2010 | Tamarkin ............. | G09B 21/003 434/295 |
| 8,277,225 B2 | * | 10/2012 | Atchison ................ | G09B 23/30 434/267 |
| 8,460,005 B1 | * | 6/2013 | Pompey ................. | G09B 19/00 434/295 |
| 2003/0224335 A1 | * | 12/2003 | Frederick ......... | C07K 14/70589 434/193 |
| 2013/0177890 A1 | * | 7/2013 | Sakezles ................ | G09B 23/30 434/272 |
| 2015/0269870 A1 | * | 9/2015 | McGill .................... | G09B 5/02 434/295 |
| 2016/0140877 A1 | * | 5/2016 | Qi ........................ | G09B 23/30 434/267 |

* cited by examiner

*Primary Examiner* — Kurt Fernstrom
(74) *Attorney, Agent, or Firm* — Kim and Lahey Law Firm LLC; Douglas W. Kim (57) ABSTRACT

This teaching tool can include: a base having an A base opening, a B base opening, and a Rh base opening; a set of antibody assemblies including; a blood cell model having an set of openings for receiving at least one of a set of antigen assemblies wherein when the A antigen head of the blood cell antigen assembly is received into the A assembly, A agglutinate is represented, wherein the B antigen head of the blood cell antigen assembly is received into the B assembly, B agglutinate is represented, and wherein the Rh antigen head of the blood cell antigen assembly is received into the Rh assembly, Rh agglutinate is represented; and, a capillary representation defining a capillary cavity for comparison with A, B, or Rh agglutinated representations to determine if the A, B or Rh agglutinated can be received in the capillary representation.

17 Claims, 7 Drawing Sheets

BLOOD TYPING INSTRUCTIONAL SYSTEM

BACKGROUND OF THE INVENTION

1) Field of the Invention

The present invention relates to blood typing and more specifically, to a system and method for teaching blood typing in the academic setting.

2) Description of Related Art

Blood typing is a laboratory test done to determine a person's blood type. There are many reasons to know an individual's blood type such as if the person needs a blood transfusion. If the blood type of the person is not known, the type of blood that the person will accept cannot be determined, potentially resulting in an ABO incompatibility transfusion reaction. ABO incompatibility is rare, but potentially fatal.

There are four main red blood cell types, known as A, B, AB, and O. If you are type A, your red blood cells have glycoproteins attached to them known as A antigens. Type B blood cells carry B antigens. Type AB blood has both A and B antigens, and type O blood has neither. Normally, your immune system will produce antibodies against any blood antigens you do not have in your own blood. That means type A people create antibodies against B antigens, and a transfusion of type B or AB blood would lead to an ABO incompatibility reaction. In other words, if you received B or AB blood, your immune system would attack the new blood cells and destroy them. If you have type AB blood, you have both A and B antigens. This means you are a universal recipient and can receive any type of blood. However, you can only donate blood to other type AB people. If you have type O blood, which has no antigens, you are a universal donor.

In addition to the A and B antigens, there is also the Rh factor to consider. Rh factor denotes an antigen found on the surface of red blood cells. If an antigen can be positive (Rh positive or Rh+) or negative (Rh negative or Rh−). Blood used in transfusions must match donors for Rh status. For example, Rh− patients will develop anemia if given Rh+ blood. Rh typing is also important during abortion, miscarriage, pregnancy, and birth, as mother and fetus may not be Rh-compatible. Given the importance of blood typing and Rh factor determination, teaching proper blood typing is a critical portion of the medical education.

Accordingly, it is an object of the present invention to provide an instructional tool for assisting with teaching of blood type analysis.

It is an object of the present invention to provide an instructional tool that allows hands on teaching.

It is an object of the present invention to provide for a teaching tool that does not rely upon color.

BRIEF SUMMARY OF THE INVENTION

The present invention and above objects can be achieved by providing a teaching tool for blood typing that can include: a base having an A base opening, a B base opening, and a Rh base opening; a set of antibody assemblies including: an A assembly received in the A base opening having an A stem, an A first fork, and an A second fork attached to the A stem, an A connector attached to a distal end of each A fork, and an A receptor removably attached to the A connector, an B assembly received in the B base opening having a B stem, a B first fork, and a B second fork attached to the B stem, a B connector attached to a distal end of each B fork, and a B receptor removably attached to the B connector, and an Rh assembly received in the Rh base opening having a Rh stem, a Rh first fork, and a Rh second fork attached to the Rh stem, a Rh connector attached to a distal end of each Rh fork, and a Rh receptor removably attached to the Rh connector, a blood cell model having an set of openings for receiving at least one of a set of antigen assemblies including an A antigen having an A antigen head, B antigen having a B antigen head, and Rh antigen assembly having an Rh antigen head; wherein when the A antigen head of the blood cell antigen assembly is received into the A assembly, A agglutinate is represented, wherein the B antigen head of the blood cell antigen assembly is received into the B assembly, B agglutinate is represented, and wherein the Rh antigen head of the blood cell antigen assembly is received into the Rh assembly, Rh agglutinate is represented; and, a capillary representation defining a capillary cavity for comparison with A, B or Rh agglutinated representations to determine if the A, B or Rh agglutinated can be received in the capillary representation.

A shaft can be included in the antigen assemblies is straight. The shaft of the antigen assembly can have a three dimensional cross-section. The blood cell model can include a top portion and a bottom portion that can be joined to form the blood cell model. Three blood cell models having identical blood cell antigen assemblies are tested against the A antibody assembly, B antibody assembly, and Rh antibody assembly. One of the receptors can include a cavity for receiving a four sided antigen head. One of the receptors can include a cavity for receiving a three sided antigen head. A cavity for receiving an antigen head can have a rounded cross-section. The cross-section of the antigen heads can be unique and selected from the group consisting of: circle, oval, square, rectangle, triangle, and any combination. The area of the cross-section of the antigen can increase as the cross section moves away from a distal end of the antigen head. The receptors each have a unique cavity relative to other receptors. The cavity of receptors can be configured to receive an antigen head taken from a group consisting of: a four sided antigen head, a three sided antigen head, an antigen head having a rounded cross-section, and any combination.

The invention can include a first blood cell model having an antigen head configuration including one or more antigen heads selected from the group consisting of an A antigen head, a B antigen head, and a Rh antigen head; a second blood cell model having the same antigen head configuration as the first blood cell model; an antibody assembly having an antibody receptor selected from the group consisting of: an A receptor, a B receptor, a Rh receptor, and any combination; wherein if the A antigen head of the blood cell is received by an A receptor, A agglutinate is represented, when the B antigen head of the blood cell is received by the B receptor, B agglutinate is represented, and when the Rh antigen head of the blood cell antigen assembly is received by Rh receptor, Rh agglutinate is represented.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Figure 1:
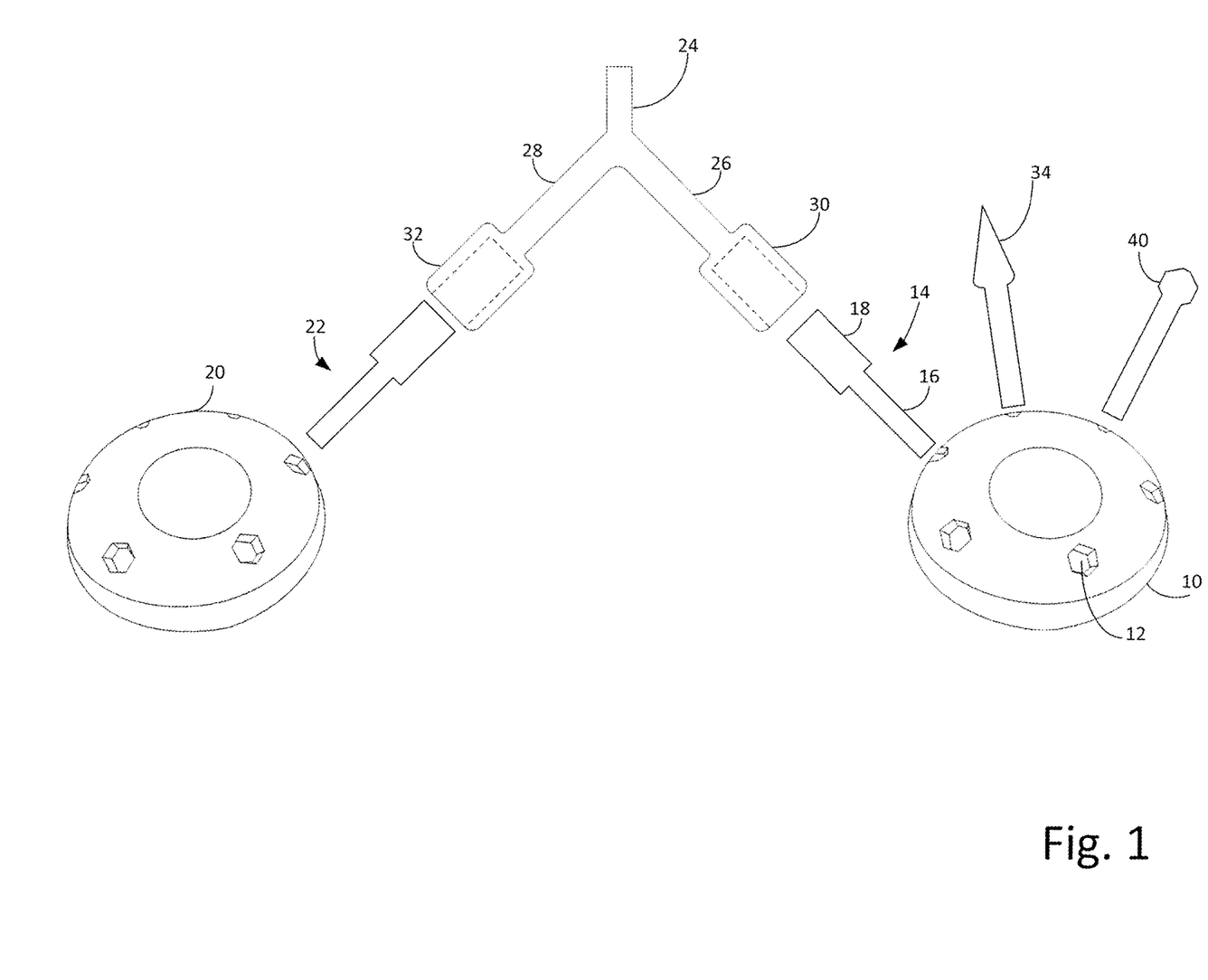
FIG. 1 is a perspective view of aspects of the invention.

With reference to the drawings, the invention will now be described in more detail. Referring to FIG. 1, the cell model 10 includes opening 12 that can be polygons in one embodiment. The openings can receive any one of a number of antigen models 14 that can include an antigen shaft 16 and an antigen head 18. As the antigen models are three dimensional, the head can be a shape taken from the group comprising: cone, cylinder, sphere, cube, rectangle, polygon, prism, pyramid, or any combination. In use, a particular shaped antigen model can represent the antigen type present on the surface of a red blood cell.

By way of example only, the rectangular type head of the antigen model can represent the A antigen with an anti-A antibody represented by an antibody model having an antigen receptor to receive the rectangular head. The circular type head 40 of the antigen model can represent the B antigen with an anti-B antibody represented by an antibody model having an antigen receptor to receive the circular head. The triangular or cone type antigen assembly 34 of the antigen model can represent the Rh antigen with an anti-Rh antibody represented by an antibody model having an antigen receptor to receive the triangular or cone type head. The antigen model provided with an antigen assembly that can include an antigen assembly having an antigen head and antigen shaft that can be received by the blood cell model.

Figures 2A, 2B:
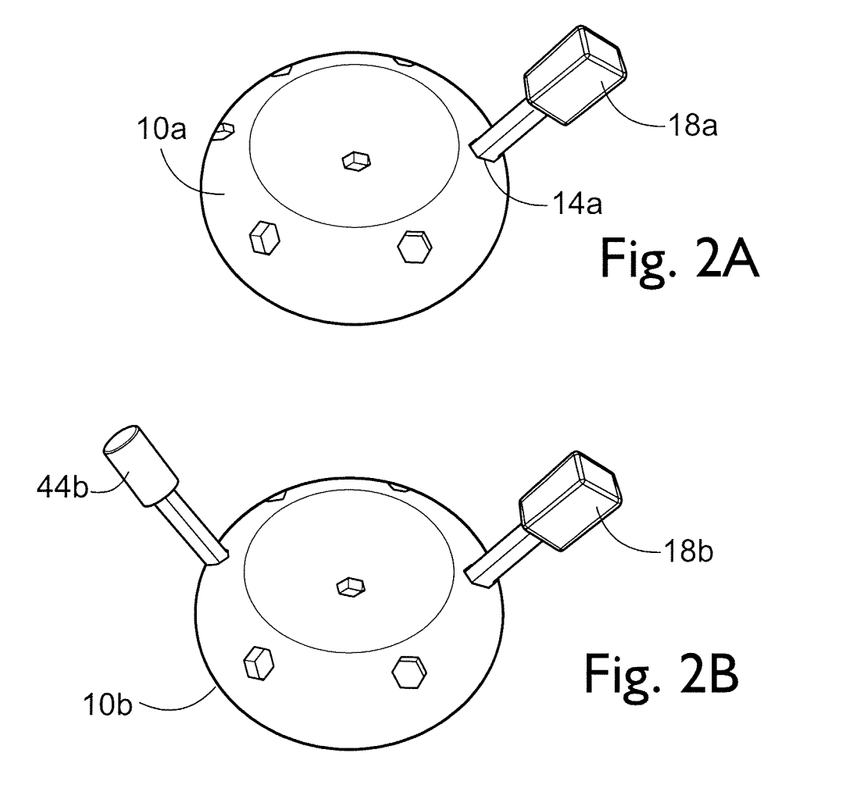
FIG. 2A is a perspective view of aspects of the invention.
FIG. 2B is a perspective view of aspects of the invention.

When a second cell model 20 is used, with an antigen model 22, the antibody model 24 can be used to "type the blood". The antibody model includes a first fork 26 and a second fork 28. Each fork can include a first antigen receptor 30 and a second antigen receptor 32 respectively. Referring to FIG. 2A, the blood cell model 10a is shown with an antigen assembly 14a received into opening 12 of the blood cell model. In one embodiment, the antigen head 18a can represent the A antigen. In operation, when a student tests the A antigen against the A reagent that can be attached to the base, the A antigen can be received into the A antibody cavity representing A agglutinate. Since there is not another antigen attached, the blood cell model 10a does not have an antigen that can be received into the B antibody or the Rh antibody of the base representing that there is no B or Rh agglutinate. Therefore, the blood cell model of FIG. 2A represents A−. In one embodiment, there can be three blood cell models having the same antigen configuration so that the blood cell configuration can be tested against the three antibodies of the base without having to remove a blood cell model from one antibody model to the other during blood cell model testing.

Referring to FIG. 2B, the blood cell 10b is shown having the A antigen 18b and a B antigen 44b. When a student tests the blood cell model 10b against the A reagent that can be attached to the base, the A antigen can be received into the A antibody cavity representing A agglutinate and the B antigen can be received into the B antibody cavity representing B agglutinate. Since there is only an A antigen and B antigen, the blood cell model of FIG. 2B represents AB−.

Figure 2C:
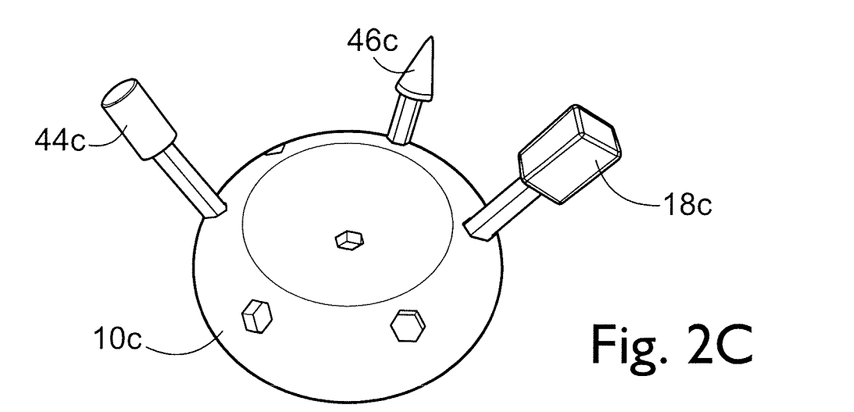
FIG. 2C is a perspective view of aspects of the invention.

Referring to FIG. 2C, the blood cell 10c is shown having the A antigen 18c, a B antigen 44c, and a Rh antigen 46c. When a student tests the blood cell model 10b against the A reagent that can be attached to the base, the A antigen can be received into the A antibody cavity representing A agglutinate, B antigen can be received into the B antibody cavity representing B agglutinate, and Rh antigen can be received into the Rh antibody cavity representing Rh agglutinate. Therefore, the blood cell model of FIG. 2C represents AB+. If the blood cell model were to have no antigens attached, it would represent O. With these various combination, the blood types can be represented and tested against the antibodies attached to the base and the following combination of TABLE 1.

TABLE 1

| Reagents/Antibodies (X = agglutinate) | | | |
|---|---|---|---|
| A | B | Rh | Blood Type |
| X | X | X | AB+ |
| X | X |   | AB− |
| X |   | X | A+ |
| X |   |   | A− |
|   | X | X | B+ |
|   | X |   | B− |
|   |   | X | O+ |
|   |   |   | O− |

By having the anti-A antibody and the anti-B antibody receive their respective heads of the respective antigen model, the blood type can be determined. In the event that there is no match between the antigens and the antibodies, the blood type would be O as the anti-A antibody and anti-B antibody would not be able to be received in any antigen model.

Additionally, the ability to represent the Rh factor can be incorporated into this invention. For example, the polygon head 40 can represent the Rh positive by including the Rh antigen model on the cell model. If the Rh positive antibody model includes the ability to receive the polygon head, then the cell model is Rh positive. If there is no Rh antigen present, the cell model represents that the cell is Rh negative.

Figure 3:
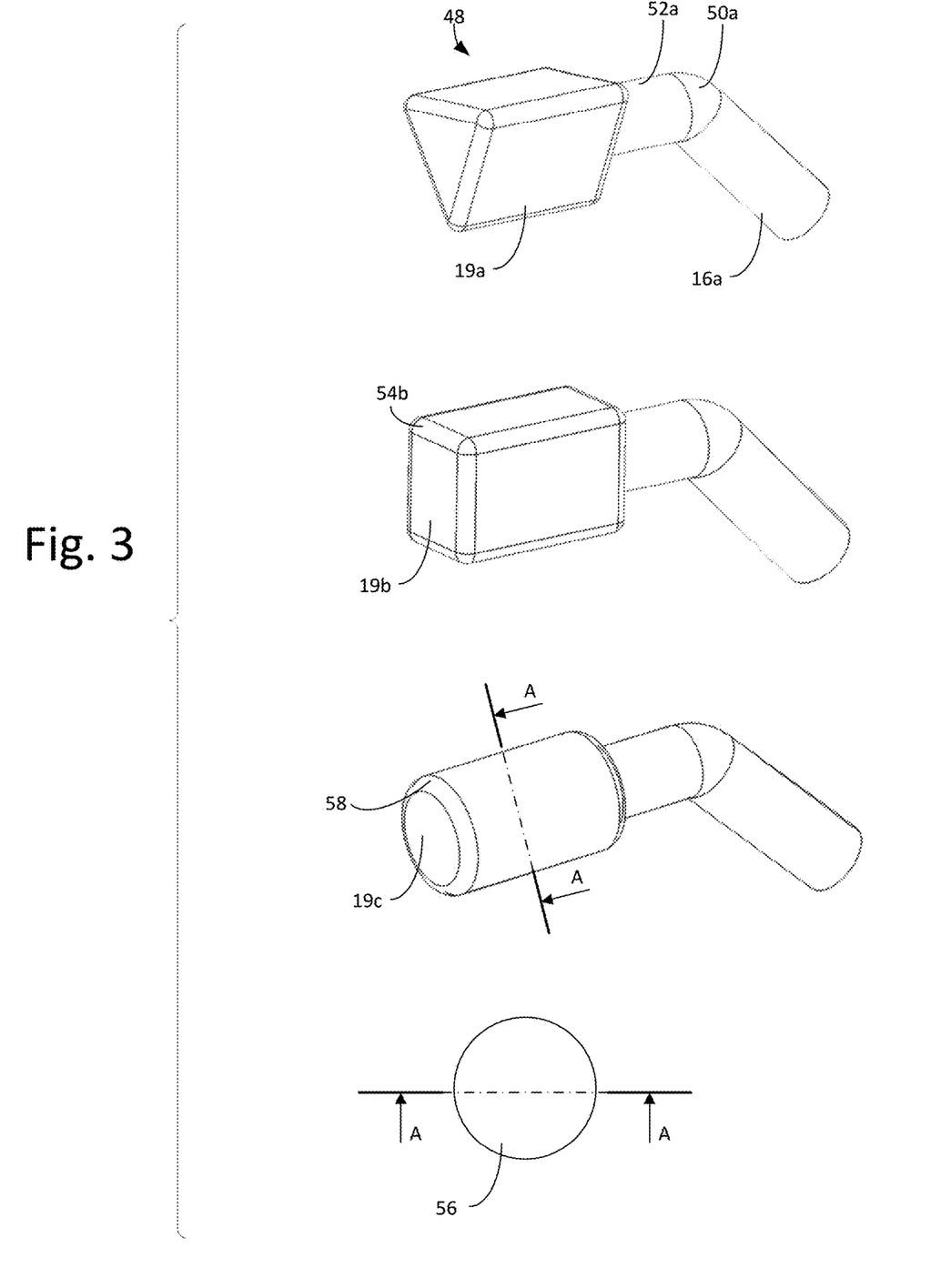
FIG. 3 is a perspective view of aspects of the invention.

Referring to FIG. 3, various geometric shapes are shown representing various antigens. The stems of the antigen model can include differing cross sections that can correspond to different openings defined in the cell model so that certain antigen models can only be placed in certain openings. In one embodiment, the cross section of the stems is taken from the group of circle, square, rectangle, polygon, triangle, and the like. In one embodiment, antigen model or assembly 48 includes the head 19*a* having a triangular cross-section. The head 19*a* can be fixed or removably affixed a shaft 16*a*. The shaft can include a bend portion 50*a* and a top portion 52*a*. The head can be attached to the top portion of the shaft. By including the bent portion in the shaft, when the blood cell model is tested with the antibody assemblies attached to the base, the blood cell model can be placed on the same surface as the base in one embodiment.

In one embodiment, antigen model or assembly can include head 19*b* having a rectangular or square cross-section shape. The edges, such as 54*b*, can be rounded to facilitate the head being received in the cavity of the antibody assembly. The corners can also be rounded in one embodiment. In one embodiment, antigen model or assembly can include head 19*c* having a circular or oval cross-section 56. The top of head 19*c* can include a rounded top edge 58.

Figure 4A:
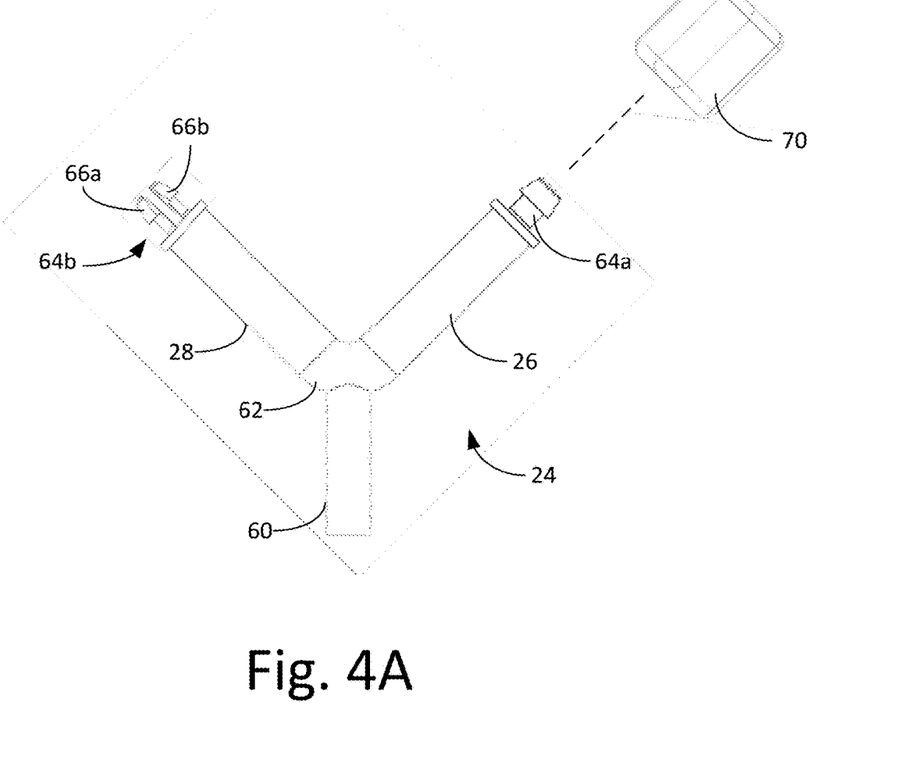
FIG. 4A is a front view of aspects of the invention.

Referring to FIG. 4A the antibody model 24 or assembly is shown. An antibody shaft 60 can be received into an opening such as in the base and can be attached to a split 62. The split can be attached to a first fork 26 and a second fork 28. Connectors 64*a* and 64*b* can be attached to the first and second forks. In one embodiment, the connectors can include an A connector, B connector, and Rh connector that are attached to the distal end of the first and/or second leg of the antigen receptor. The connectors can include releasing members 66*a* and 66*b* allowing an antigen receptacle 70 to be removable attached to the connectors.

Figure 4B:
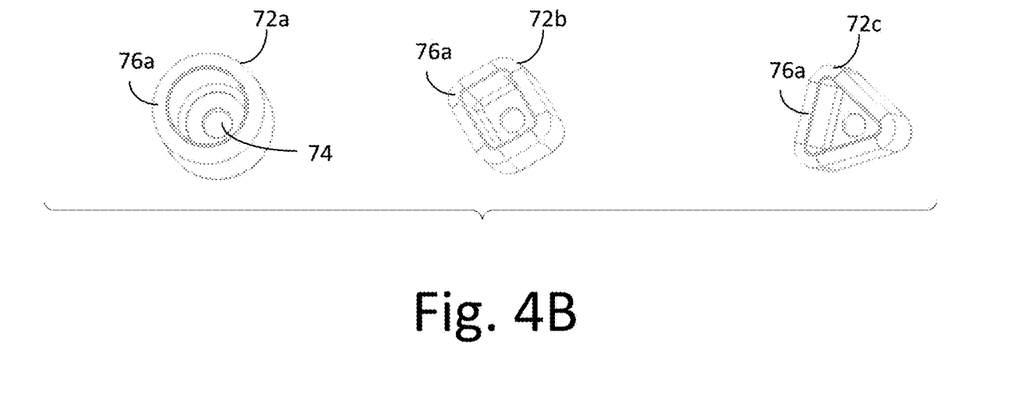
FIG. 4B is a perspective view of aspects of the invention.

Referring to FIG. 4B, the receptor can include a cavity with a circular of oval cross-section such as 72*a*, square or rectangular cross-section such as 72*b*, or triangular cross-section such as 72*c*. The receptor can include an opening 74 allowing the receptacle to be attached to the connector. The receptor can include rounded leading edges 76*a* through 76*c* to facilitate receiving the antigen head.

Figure 5:
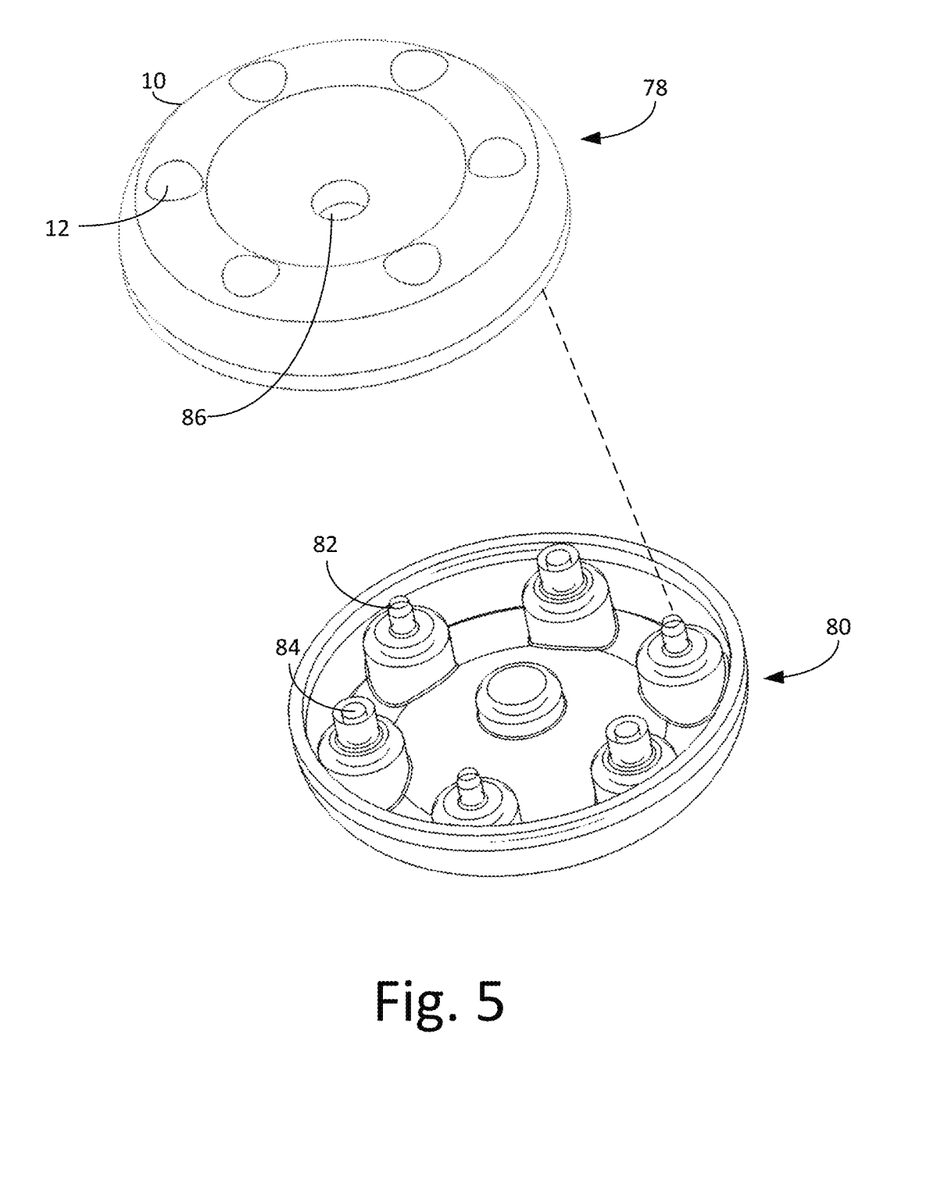
FIG. 5 is a perspective view of aspects of the invention.

Referring to FIG. 5, the blood cell model 10 is shown having at least one opening 12 for receiving antigen models. The opening can be defined on one or both sides of the blood cell model. The blood cell model 10 can be formed with a top cell portion 78 and bottom cell portion 80. Each portion can include a male inner connector member 82 and a female inner connector member 84 that allow the two portions to be joined forming the blood cell model. The openings can be aligned with the inner connector members to facilitate manufacturing. A central opening or cavity 86 can be included in one or more portions.

Figure 6A:
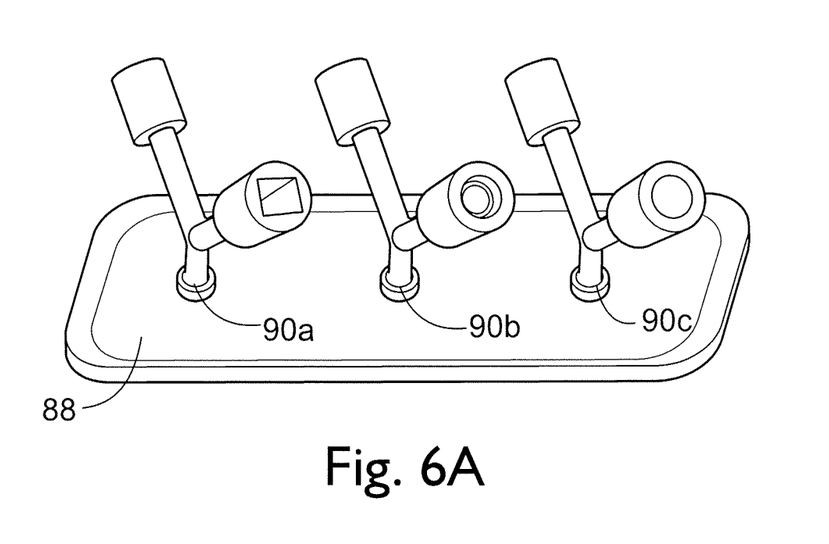
FIG. 6A is a perspective view of aspects of the invention.
Figure 6B:
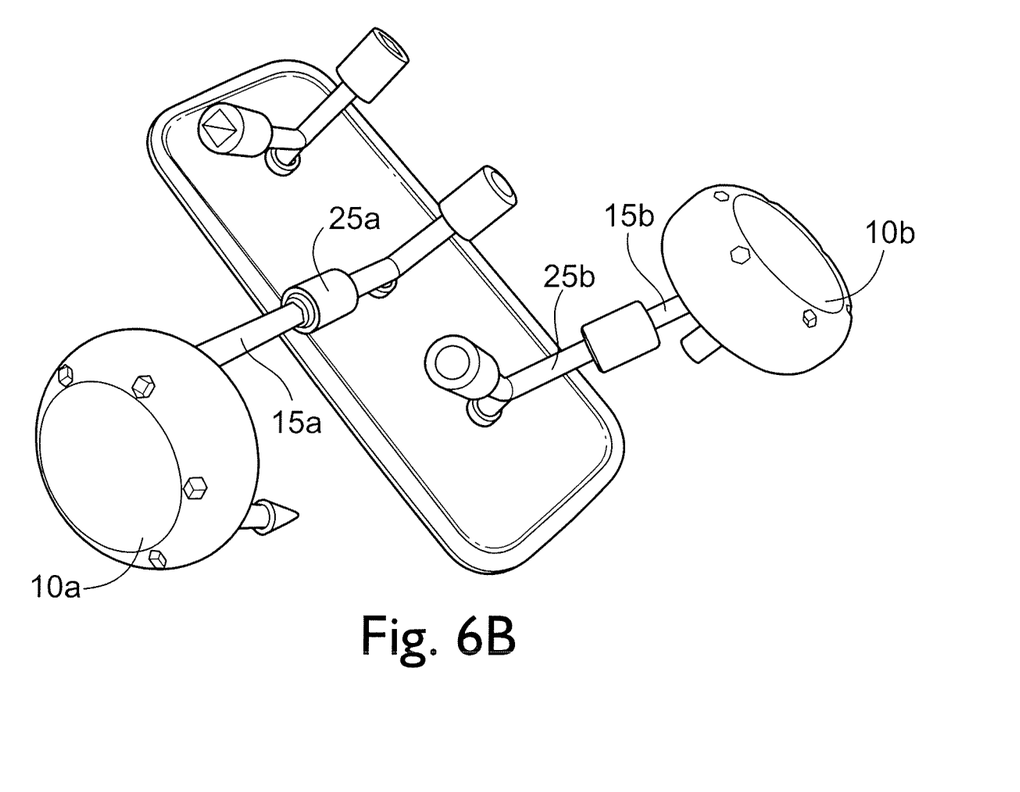
FIG. 6B is a perspective view of aspects of the invention; and,
FIG. 7 is a flowchart of the present invention.

Referring to FIG. 6A, base 88 is shown having opening 90*a* through 90*c* that can receive the antibody model of assembly. The openings can be labeled as the A antibody, B antibody, and Rh antibody respectfully. When a blood cell is tested by determining if an antigen attached to the blood cell model can be received by an antigen, the blood type can be determined based upon the connections made between the blood cell model antigens representations and the antibody model representations. Referring to FIG. 6B, blood cell model 10*a* includes antigen 15*a* than can be received in the antibody model 25*a* thereby indicating that, in this embodiment, the blood cell model results in B agglutinate. The blood cell model 10*b*, including the same antigen configuration of blood cell model 10*a*, includes the antigen 15*b* that can be received into the antibody model 25*b* representing Rh agglutinate. Since this blood model does not include an A antigen, but includes the B antigen and Rh antigen, this blood cell model represents the blood type B+.

In one embodiment, the antibody models can be connected so that with each antibody model connected to two cells, and multiple antibody models connected together, the visual representation of clumping is shown. By using three dimensional shapes, individuals with color blindness would not be confused with other models that rely upon color instead of shapes. Additionally, the invention can be used through tactile input alone not necessarily requiring that sight be involved.

One example of a configuration of the invention is where the blood cell model has antigens. In this example, the antigen can be the A antigen. When tested with the A, B, and Rh antibody, and based upon the respective antigen heads and antibody cavities, the A antibody will connect to the A antigen and represent agglutination or clumping of the various blood cell models. The agglutinated blood cell models occur at a certain area that includes a width. The invention can also include a representation of a capillary or other blood vessel that can take a generally cylinder shape and have a diameter. Due to the area or width of the agglutinated blood cell model, it cannot fit into the capillary representation thereby illustrating that it is not advisable to provide A type blood (e.g. blood with A antigens) to an individual with A antibodies as it can cause blockages. The capillary representation 94 can be a generally flexible material that can include releasable fasteners on each end of the material such as hook and loop fasteners with the hook portion on one end of the material and the loop portion on the other end of the material so that the end can be releasable joined to form a general circular cross-section or cylinder shape defining a cavity in the capillary representation.

Figure 7:
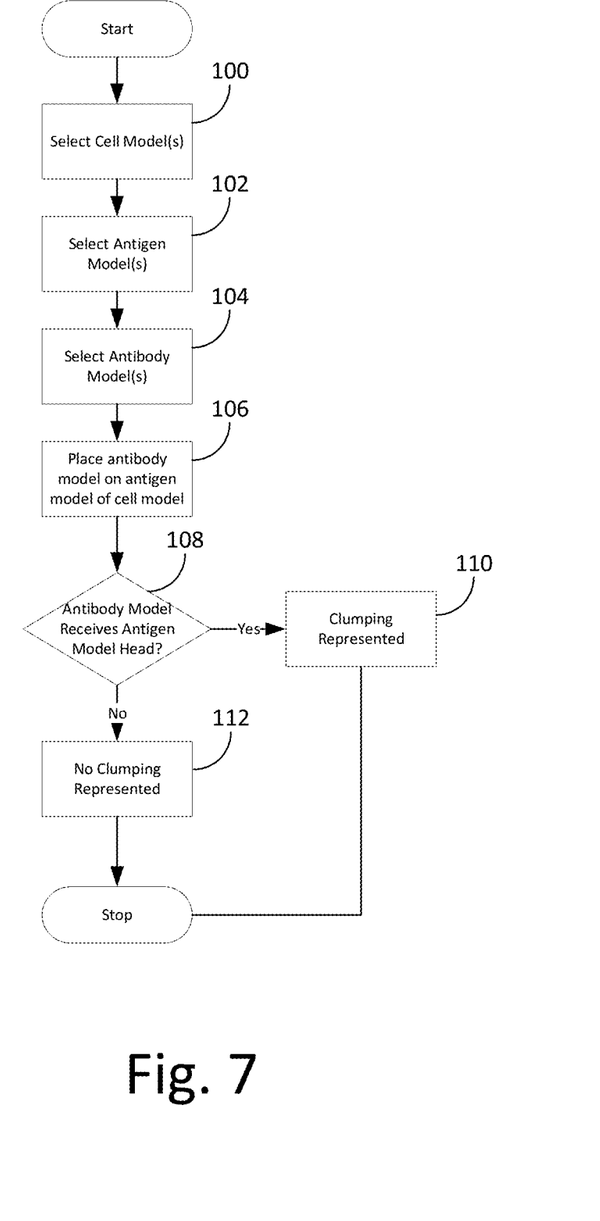

Referring to FIG. 7, the process of using the invention is shown by way of example. One or more cell models are selected at step 100. One or more antigen models are selected at step 102. The selected antigen models are then attached to the one or more cell models to represent blood cells that are taken from the group consisting of A-type, B-type, and Rh+. In one embodiment, the antigen models can represent the more rare blood types that include types such as K:−1, and Jk(b−).

Once the antigen models have been attached to the cell model, the antibody model can be selected at 104. The antibody model is then placed onto one or more of the antigens to determine if the antibody model can receive the antigen head at 106. If so, clumping is represented at 110, and if not, no clumping is represented at 112.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A teaching tool for blood typing comprising:
   a base having an A base opening, a B base opening, and a Rh base opening;
   a set of antibody assemblies including: an A assembly received in the A base opening having an A stem, an A first fork, and an A second fork attached to the A stem, an A connector attached to a distal end of each A fork, and an A receptor removably attached to the A connector, a B assembly received in the B base opening having a B stem, a B first fork and a B second fork attached to the B stem, a B connector attached to a distal end of each B fork, and a B receptor removably attached to the B connector, and an Rh assembly received in the Rh base opening having an Rh stem, an Rh first fork and an Rh second fork attached to the Rh stem, an Rh connector attached to a distal end of each Rh fork, and an Rh receptor removably attached to the Rh connector,
   a blood cell model having a set of openings for receiving at least one of a set of antigen assemblies including an A antigen having an A antigen head, B antigen having a B antigen head, and Rh antigen assembly having an Rh antigen head;
   wherein when the A antigen head of the blood cell antigen assembly is received into the A assembly, A agglutinate is represented, wherein the B antigen head of the blood cell antigen assembly is received into the B assembly, B agglutinate is represented, and wherein the Rh antigen head of the blood cell antigen assembly is received into the Rh assembly, Rh agglutinate is represented; and,
   a capillary representation defining a capillary cavity for comparison with A, B, or Rh agglutinated representations to determine if the A, B, or Rh agglutinated can be received in the capillary representation.

2. The teaching tool of claim 1 wherein a shaft included in the antigen assemblies is straight.

3. The teaching tool of claim 1 wherein a shaft of the antigen assembly has a three dimensional cross-section.

4. The teaching tool of claim 1 wherein the blood cell model includes a top portion and a bottom portion that can be joined to form the blood cell model.

5. The teaching tool of claim 1 wherein three blood cell models having identical blood cell antigen assemblies are configured to be compared against the A antibody assembly, B antibody assembly, and Rh antibody assembly.

6. The teaching tool of claim 1 wherein one of the receptors includes a cavity for receiving a four-sided antigen head.

7. The teaching tool of claim 6 wherein one of the receptors includes a cavity for receiving a three-sided antigen head.

8. The teaching tool of claim 7 wherein one of the receptors includes a cavity for receiving an antigen head having a rounded cross-section.

9. A teaching tool for blood typing comprising:
   an antibody assembly taken from the group consisting of: an A antibody assembly having an A receptor, a B antibody assembly having a B receptor, and an Rh antibody assembly having an Rh receptor;
   a blood cell model having an antigen head selected from the group consisting of: an A antigen head, a B antigen head, and an Rh antigen head wherein the area of the cross-section of the antigen increases as the cross section moves away from a distal end of the antigen head; and,
   a plurality of receptors wherein the receptors each have a unique cavity relative to other receptors.

10. The teaching tool of claim 9 wherein the cross-section of the antigen heads is unique and selected from the group consisting of: circle, oval, square, rectangle, triangle.

11. The teaching tool of claim 9 wherein the cavity of receptors is configured to receive an antigen head taken from a group consisting of: a four-sided antigen head, a three sided antigen head, an antigen head having a rounded cross-section.

12. The teaching tool of claim 9 wherein three blood cell models having identical antigen assemblies are configured to be compared against the A antibody assembly, B antibody assembly, and Rh antibody assembly.

13. The teaching tool of claim 12 including a capillary representation defining a capillary cavity configured to be compared with one or more A, B, or Rh agglutinated representations to determine if the A, B or Rh agglutinated can be received in the capillary representation.

14. A teaching tool for blood typing comprising:
   a first blood cell model having an antigen head configuration including an A antigen head, a B antigen head, and an Rh antigen head;
   a second blood cell model having the same antigen head configuration as the first blood cell model;
   an antibody assembly having an antibody receptor selected from the group consisting of: an A receptor, a B receptor, an Rh receptor;
   wherein if the A antigen head of the blood cell is received by an A receptor, A agglutinate is represented, when the B antigen head of the blood cell is received by the B receptor, B agglutinate is represented, and when the Rh antigen head of the blood cell antigen assembly is received by Rh receptor, Rh agglutinate is represented; and, wherein the antigen heads are removably attached to the first blood cell and the second blood cell by a shaft.

15. The teaching tool of claim 14 wherein the blood cell model includes a top portion and a bottom portion that can be joined to form the blood cell model.

16. The teaching tool of claim 14 wherein three blood cell models having identical blood cell antigen assemblies are configured to be compared against the antibody assemblies.

17. The teaching tool of claim 16 including a capillary representation defining a capillary cavity configured to be compared with one or more an A, B or Rh agglutinated representations to determine if the A, B or Rh agglutinated can be received in the capillary representation.

* * * * *